United States Patent
Nikolac et al.

(10) Patent No.: US 7,181,360 B1
(45) Date of Patent: Feb. 20, 2007

(54) METHODS AND SYSTEMS FOR GENERATING TEST PLANS FOR COMMUNICATION DEVICES

(75) Inventors: Fred Nikolac, San Jose, CA (US); Roy Chua, Sunnyvale, CA (US)

(73) Assignee: Spirent Communications, Rockville, MD (US)

( * ) Notice: Subject to any disclaimer, the term of this patent is extended or adjusted under 35 U.S.C. 154(b) by 17 days.

(21) Appl. No.: 10/769,614

(22) Filed: Jan. 30, 2004

(51) Int. Cl.
*G01R 31/00* (2006.01)

(52) U.S. Cl. ......................................... 702/119; 714/37

(58) Field of Classification Search ............ 702/57–58, 702/81–84, 119, 122, 182–183, 185–189; 714/25, 37–39, 46–49, 57, 701–703, 799; 717/124–127, 130–132; 340/514–516, 3.43; 379/26.01–26.02, 10.01, 10.03
See application file for complete search history.

(56) References Cited

U.S. PATENT DOCUMENTS

| | | | |
|---|---|---|---|
| 6,598,183 B1 * | 7/2003 | Grieco et al. ................. 714/43 |
| 6,728,214 B1 * | 4/2004 | Hao et al. .................... 370/241 |
| 6,772,083 B2 * | 8/2004 | Muller et al. ................ 702/123 |
| 2002/0162059 A1 * | 10/2002 | McNeely et al. ........... 714/703 |
| 2003/0028353 A1 * | 2/2003 | Gventer ....................... 702/182 |
| 2003/0036865 A1 * | 2/2003 | Zhuo et al. ................... 702/81 |
| 2004/0103396 A1 * | 5/2004 | Nehab ......................... 717/127 |
| 2004/0107415 A1 * | 6/2004 | Melamed et al. ........... 717/124 |
| 2004/0143819 A1 * | 7/2004 | Cheng et al. ................ 717/125 |
| 2004/0153837 A1 * | 8/2004 | Preston et al. ................ 714/39 |

* cited by examiner

*Primary Examiner*—Marc S. Hoff
*Assistant Examiner*—Mary Catherine Baran
(74) *Attorney, Agent, or Firm*—Martine Penilla & Gencarella, LLP

(57) ABSTRACT

A computer implemented method for generating a test plan for a communication device under test. The test plan defines test tools, test methodologies, test configurations, and algorithms for executing the test. A user input is received to define the communication device under test. Next, a knowledge database is searched to identify test plan parameters for the communication device under test. Thereafter, the test plan parameters and the user input are analyzed to identify the test plan. A system and computer readable medium having program instructions for generating a test plan for a communication device under test are also described.

21 Claims, 8 Drawing Sheets

TEST SYSTEM

METHODS AND SYSTEMS FOR GENERATING TEST PLANS FOR COMMUNICATION DEVICES

BACKGROUND OF THE INVENTION

1. Field of the Invention

The present invention relates to testing communication devices and, more particularly, to methods and systems for generating a test plan for a communication device.

2. Description of the Related Art

Typically, after a communication device is designed or installed, the communication device needs to be tested. A test tool may be used to test the communication device. Typical features of the communication device that can be tested include: (1) reliability (e.g., mean time before failure, mean time to repair, etc.); (2) stability; (3) recoverability; (4) performance (e.g., throughput, bandwidth capacity, rate, etc.); (5) compatibility (e.g., interface issues, etc.); (6) scalability (i.e., ability to add more communication devices or more capacity); and (7) manageability (e.g., Simple Network Management Protocol (SNMP) monitoring, etc.).

Due to the complexity of communication devices and test tools in general, a typical user usually does not have the expertise to use the test tools in conjunction with the communication devices to achieve the user's test goals. As a result, the user needs to refer to a test plan, which is essentially an instruction on how to test the communication device. The user may refer to a publication (e.g., publications by the manufacturer of the communication device, methodologies devised by independent labs, The Journal of Test Methodology, etc.) or rely on the expertise of a person (e.g., software engineers, field engineers, test tool vendors, etc.) to design a test plan. The problem with publications is that the solutions provided are generic and are often not applicable to custom configurations or problems. Furthermore, there are many publications to search and, as a result, designing test plans by using publications can be time consuming.

Designing a test plan also requires a thorough knowledge of the test tools, communication equipment, and test methodologies. A test plan designed by an expert is often inadequate because the expert's expertise is typically limited due to the enormous complexity of the testing field as well as the enormous complexity of communications equipment. Thus, the quality of the test plan designed by the expert can be unpredictable.

The numerous solutions outlined above to generate a test plan can be burdensome, time consuming, not applicable to custom configurations, unpredictable, and will likely require the user to have a thorough knowledge of testing methodologies. As a result, there is a need to provide a reliable and fast system, which can be easily operated by a user without a thorough knowledge of testing methodologies, for generating test plans that can provide solutions to the user's particular needs.

SUMMARY OF THE INVENTION

Broadly speaking, the present invention fills these needs by providing methods and systems for generating a test plan for a communication device under test. It should be appreciated that the present invention can be implemented in numerous ways, including as a process, an apparatus, a system, computer readable media, or a device. Several inventive embodiments of the present invention are described below.

One embodiment provides a computer implemented method for generating a test plan for a communication device under test. The test plan defines test tools, test methodologies, test configurations, and algorithms for executing the test. A user input is received defining the communication device under test. Next, a knowledge database is searched to identify test plan parameters for the communication device under test. Thereafter, the test plan parameters and the user input are analyzed to identify the test plan.

Another embodiment provides a computer readable medium having program instructions for generating a test plan for a communication device under test. The computer readable medium provides program instructions for receiving a user input, the user input defining the communication device under test, and program instructions for searching a knowledge database to identify test plan parameters for the communication device under test. Thereafter, the computer readable medium provides program instructions for analyzing the test plan parameters and the user input to identify the test plan.

In still another embodiment provides a system for generating a test plan for a communication device under test. The test plan defines test tools, test methodologies, test configurations, and algorithms for executing the test. The system provides a processor for enabling a user input, the user input defining the communication device under test, and a knowledge database stored in a memory. The knowledge base is searched to identify test plan parameters associated with the communication device under test and the processor analyzes the test plan parameters and the user input to identify the test plan.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is disclosed for methods and systems for generating a test plan for a communication device under test. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

The embodiments described herein provide methods and systems that generate a test plan for a communication device under test. In one embodiment, a user first selects a communication device to test. In another embodiment, the user may then additionally select a feature of the communication device to test and define a test topology. As will be explained in more detail below, based on the user inputs, a test system searches a knowledge database for test parameters, analyzes the test parameters and the user inputs, and generates a complete test plan for the user to test the communication device.

Figure 1A:
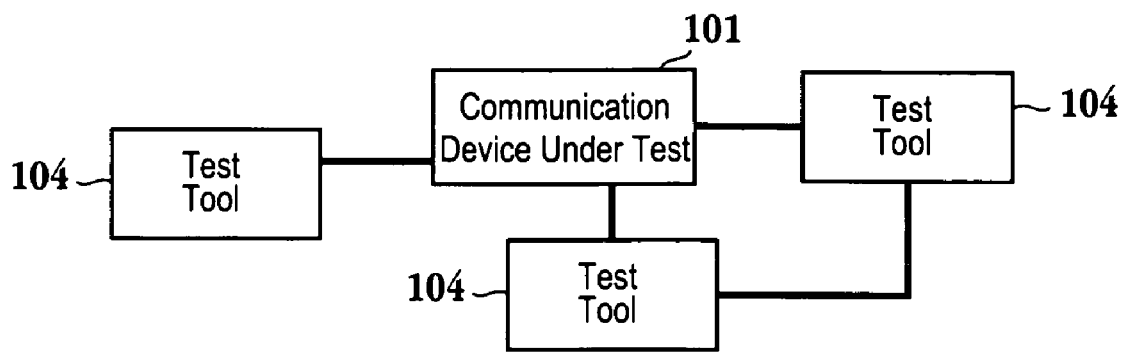
FIG. 1A is a simplified block diagram of test tools coupled to communication device under test, in accordance with one embodiment of the invention.

FIG. 1A illustrates a simplified block diagram of test tools 104 coupled to communication device under test 101, in accordance with one embodiment of the invention. Test tools 104 can include any suitable devices used to test communication device 101. Exemplary test tools include internet protocol (IP) telephony testing systems, optical fiber emulators, data link simulators, bit error rate testers, signal generators/analyzers, bulk call generators, traffic generation systems, conformance test systems, performance analysis systems, protocol analyzers, line impairment simulators, quality of service testers, packet generators, frame generators, capacity assessment appliances, etc. Additionally, communication device 101 can include any suitable device used in communications. The following Table A lists some exemplary communication devices 101.

TABLE A

Figure 1B:
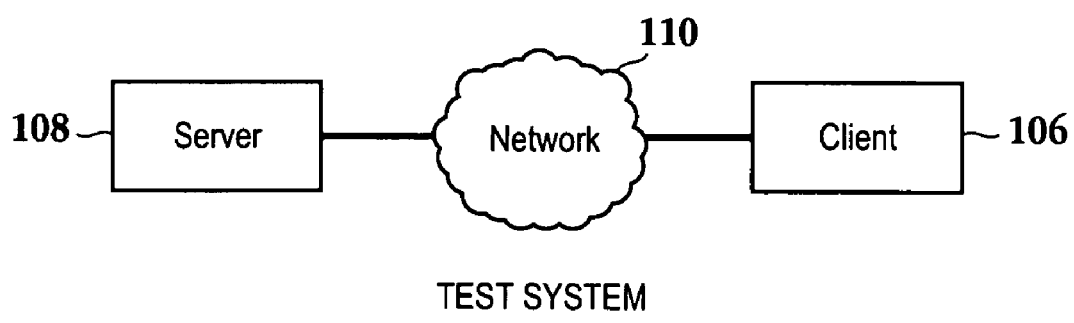
FIG. 1B is a simplified block diagram of a test system, in accordance with one embodiment of the invention.

Routers
Remote Access Servers
Asynchronous Transfer Mode (ATM) switches
Broadband equipment including: digital subscriber lines (DSL), cable modems, fixed wireless
Datacenter network equipment including load balancers, caches, firewalls, secure socket layer (SSL) accelerators, virtual private network (VPN) devices, packet shapers
Local-area network (LAN) switches
Optical equipment (long-haul wavelength division multiplexing (WDM), metro WDM, multi-service platforms, optical cross-connects)
Voice over IP (VoIP) equipment, TABLE A-continued VoIP gateway, softswitch equipment, internet protocol (IP) private branch exchange (PBX)
Managed customer premises equipment (CPE) including ATM access integrated devices, frame relay access devices (FRADs)
Channel Service Unit (CSU)/Data Service Unit (DSU)
Private branch exchange (PBX)
Central office equipment
SDH/Sonet (synchronous data hierarchy, synchronous optical networks)
Voice processing systems
Call center equipment
Web servers, application servers, database servers
Storage networks - Storage Attached Network, Network Attached Storage, FibreChannel switches, Fibre Channel over IP (FCIP) devices, Internet Small Computer System Interface (iSCSI) devices
Integrated platforms comprising features drawn from one or more of the above
Media access server
Transmission Control Protocol (TCP)/IP Gateway FIG. 1B illustrates a simplified block diagram of a test system that generates a test plan for a communication device under test, in accordance with one embodiment of the invention. Server 108 is in communication with client 106 through network 110. Server 108 and client 106 can include any suitable type of computing device with a processor and memory. For example, the computing device can include a computer system, a portable computing device, a personal digital assistant, a cell phone, etc. Generally speaking, network 110 can include any type of wire (including optical links) or wireless communication channel capable of linking together computing nodes (e.g., a local network, a wide area network, an open and modular development environment (EDMA) network, global systems for mobile communications (GSM) network, cable connection, etc.)

In one embodiment, test software for generating the test plan is executed on server 108 and client 106 may access the test software through network 110. In another embodiment, parts of the test software are executed on both server 108 and client 106. In still another embodiment, the test software is executed on one computing device and, as a result, the test system includes only one computing device.

Figure 2:
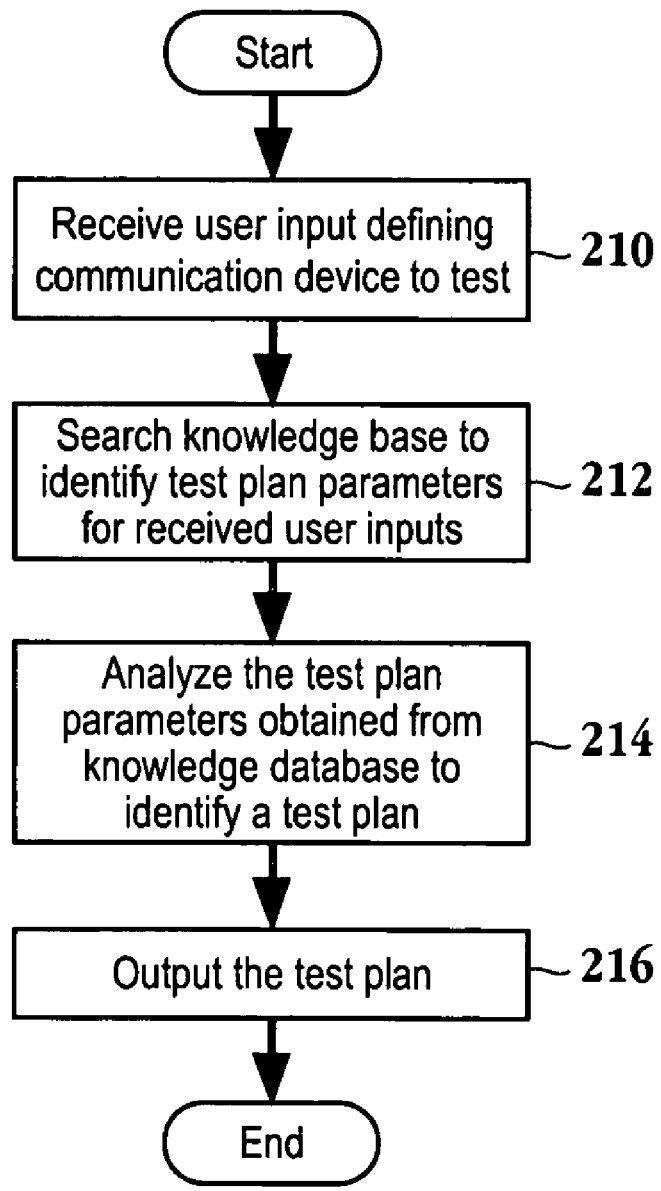
FIG. 2 is a flowchart diagram illustrating a high level overview of the method operations for generating a test plan for a communication device under test, in accordance with one embodiment of the invention.

FIG. 2 is a flowchart diagram illustrating a high level overview of the method operations for generating a test plan for a communication device under test, in accordance with one embodiment of the invention. Starting in operation 210, the test system receives a user input defining the communication device to test. Subsequently, in operation 212, the test system searches a knowledge database to identify test plan parameters (e.g., test methodologies, functional specifications, design specifications, components, duration, test goals, number of interfaces, etc.) associated with the communication device.

In operation 214, the test system then analyzes the test plan parameters obtained from the knowledge database to identify a test plan. In one embodiment, the test plan includes test methodologies, test configurations, test tools, and algorithms for executing the test using the test plan. A test methodology is a series of working procedures that enables the user to execute the test under the test plan. An algorithm may include test scripts (i.e., a list of commands in computer programming language) for executing all or parts of the test methodologies on the test tool.

After the test plan is identified, the test system outputs the test plan in operation 216. In one embodiment, the test system outputs the test plan by graphically displaying the test plan on a display screen. In another embodiment, the test system prints the test plan with a printer. In still another embodiment, the test system outputs the test plan by storing the test plan in electronic form on any suitable memories or storage medias (e.g., floppy disks, hard disks, random access memory (RAM), optical disks, tapes, etc.).

Figure 3:
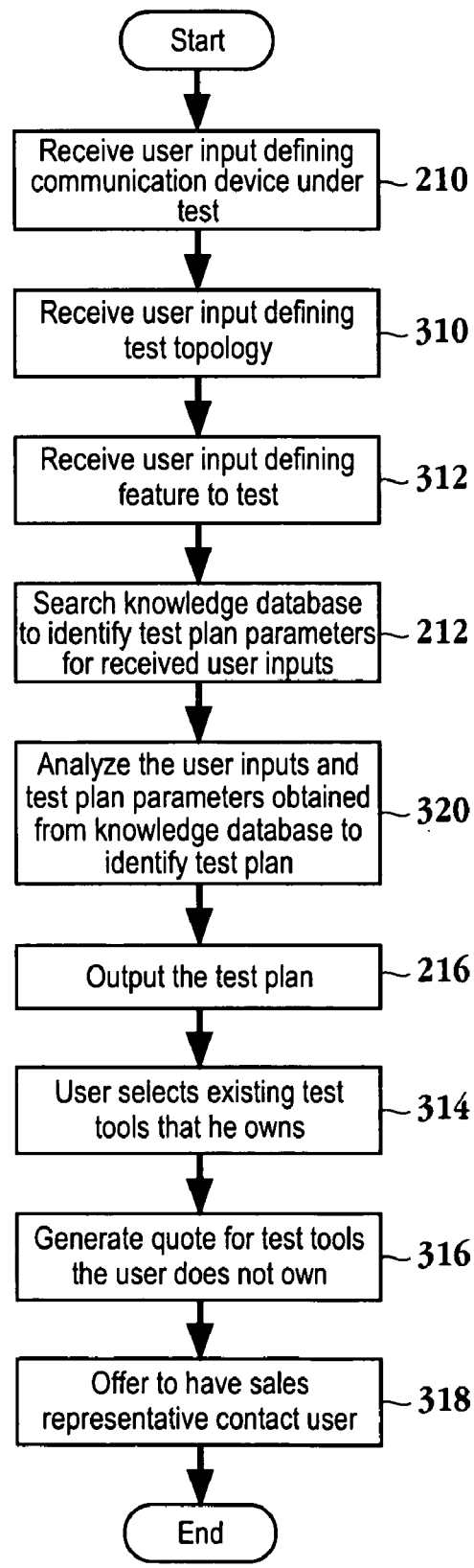
FIG. 3 is a flowchart diagram illustrating the method operations for generating a test plan for a communication device under test, in accordance with another embodiment of the present invention.

FIG. 3 is a flowchart diagram illustrating the method operations for generating a test plan for a communication device under test, in accordance with another embodiment of the present invention. As discussed above, starting in operation 210, a test system receives a user input defining the communication device to test. Subsequently, in operation 310, the test system may also receive another user input defining a custom test topology, in accordance with another embodiment of the invention. The test topology is a layout of the communication device under test with respect to other hardware elements (e.g., test tools, other communication devices, interconnects, electronic components, etc.). If the test system does not receive the user input defining the test topology, the test system will use a default test topology. In another embodiment, the test system may also receive a user input defining specific features of the communication device to test in operation 312. As discussed above, exemplary features of the communication device that can be tested include reliability, stability, recoverability, performance, compatibility, scalability, manageability, etc. If the test system does not receive the user input defining a specific feature to test, the test system will use a default set of features to test.

Thereafter, as discussed above, the test system searches a knowledge database to identify test plan parameters in operation 212, analyzes the user inputs and the test plan parameters obtained from the knowledge database to identify a test plan in operation 320, and outputs the test plan in operation 216.

The test plan shows the user all the test tools required to execute the test. In one embodiment, the user may then select the test tools that the user already owns in operation 314. Subsequently, in operation 316, the test system generates a price quote for test tools that the user does not own, in accordance with another embodiment of the invention. In still another embodiment, the test system then offers the user the option for a sales representative to contact the user in operation 318.

Figure 4A:
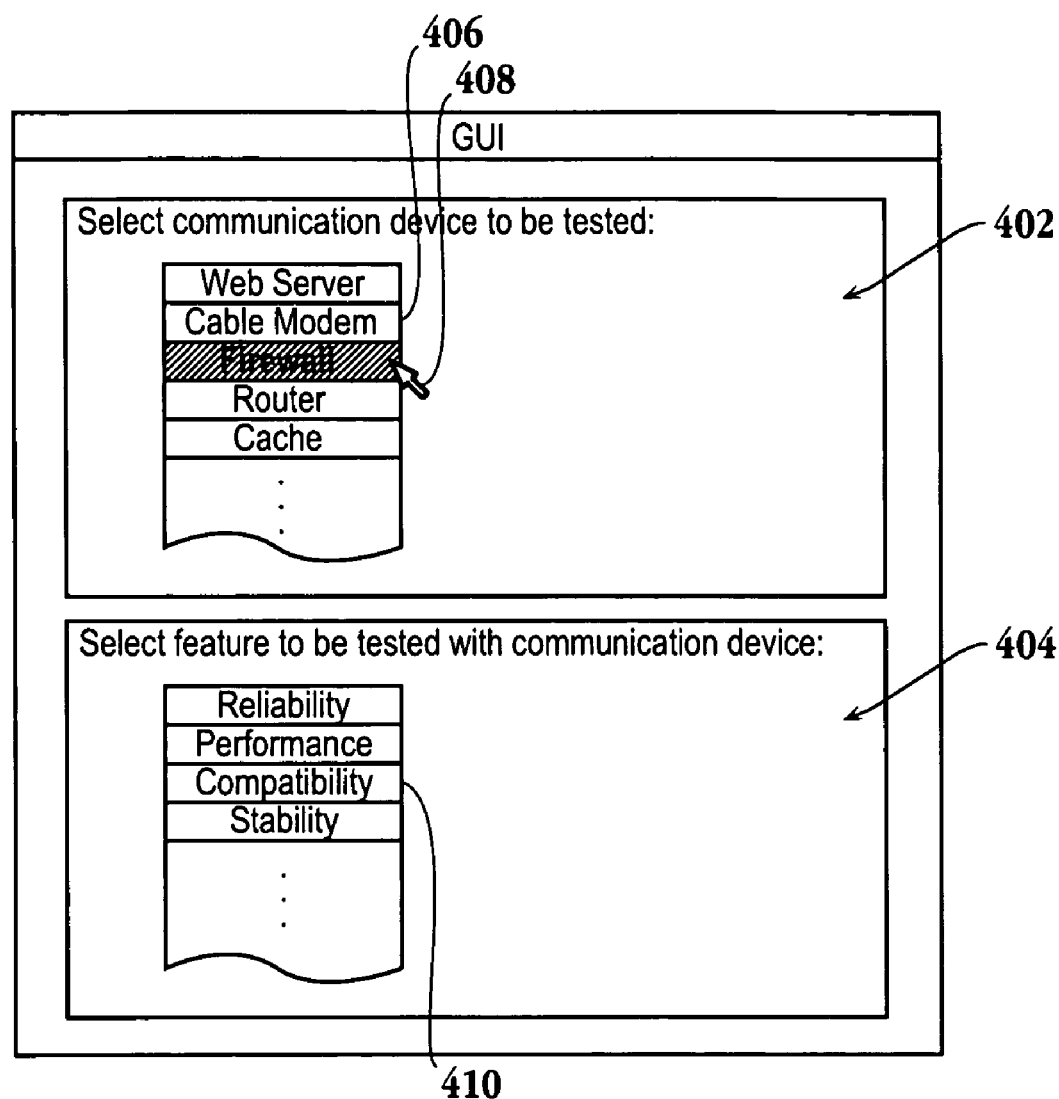
FIG. 4A is a schematic diagram of a graphical user interface (GUI) allowing a user to select a communication device and a feature of the communication device to test, in accordance with one embodiment of the invention.

FIG. 4A is a schematic diagram of a graphical user interface (GUI) allowing a user to select a communication device and a feature of the communication device to test, in accordance with one embodiment of the invention. As discussed above in operation 210 of FIGS. 2 and 3, the test system receives a user input defining the communication device to test. The user may define the communication device to test by typing or selecting the name of the communication device with a keyboard or with cursor 408, respectively, in region 402. In one embodiment, region 402 directly lists communication devices. In another embodiment, as illustrated in FIG. 4A, region 402 includes menu region 406 that lists communication devices.

Alternatively, the user may define the communication device to test by selecting a function or a set of functions of the communication device. In other words, the user can define the communication device by the device's function(s). For example, a firewall device functions as a firewall and a voice processing system functions to process voices. Table B lists additional exemplary functions.

TABLE B

Firewall function set
Voice processing function set
Quality of Service function set
Secure sockets layer (SSL) function set
Virtual private networks (VPN) function set [including IPsec, SSL-VPNs, MPLS-VPNs]
Caching function set
L2 switching
L3 switching
Streaming media function set
Routing
Storage network function set
File server function set
Server load balancer function set
Media gateway function set
PBX function set
Softswitch function set Defining the communication device by the device's functions instead of the name of the communication device is especially useful in situations where the name of the particular communication device is not listed in region 402. Furthermore, defining the communication device by the device's functions also allows the option for the user to test only a specific function of a communication device that has more than one function.

The GUI of FIG. 4A also allows the user to select a feature of the communication device to test in region 404, in accordance with another embodiment of the invention. As discussed in operation 312 of FIG. 3, the test system can receive a user input defining features to test. As discussed above, exemplary features that can be tested include reliability, stability, recoverability, performance, compatibility, scalability, manageability, etc. The user may define a feature to test by typing or selecting a name of the feature with a keyboard or with cursor 408, respectively, in region 404. In one embodiment, region 404 directly lists the features. In another embodiment, as illustrated in FIG. 4A, region 404 includes menu region 410 that lists the features.

Figure 4B:
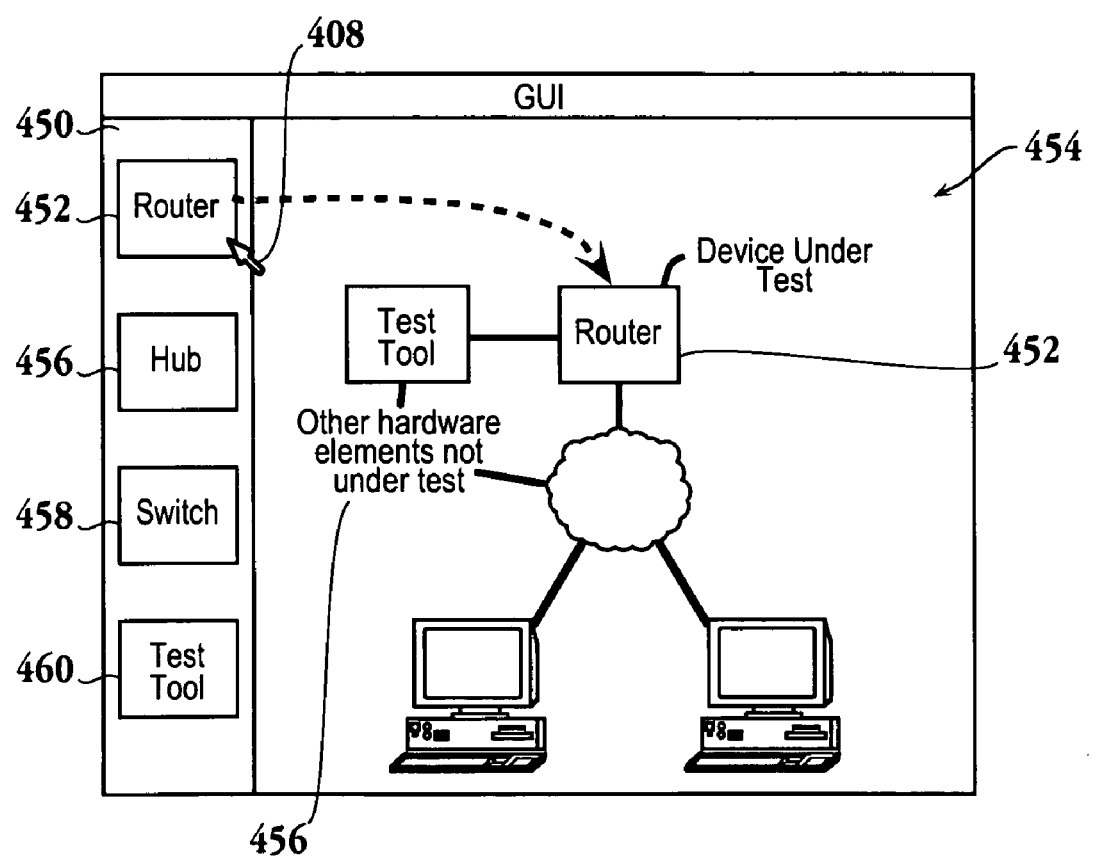
FIG. 4B is a schematic diagram of a GUI allowing a user to define a test topology of the communication device under test, in accordance with one embodiment of the invention.

FIG. 4B is a schematic diagram of a GUI allowing a user to define a test topology of the communication device under test, in accordance with one embodiment of the invention. As discussed above in operation 310 of FIG. 3, the test system receives a user input defining the test topology. The user may define the test topology by graphically arranging the communication devices and other hardware elements as illustrated in FIG. 4B, in accordance with one embodiment of the invention. As illustrated, region 450 includes a list of hardware elements such as router 452, hub 456, switch 458, test tool 460, etc. The user simply selects a communication device to test, such as router 452, with cursor 408 and drags the communication device into a suitable location within region 454. In this way, the user may also define other hardware elements not under test 456. By specifying how each communication device, test tool, and other hardware elements are connected, the user can define a test topology. In effect, the test topology is a layout of the communication device with respect to other hardware elements.

Figure 5:
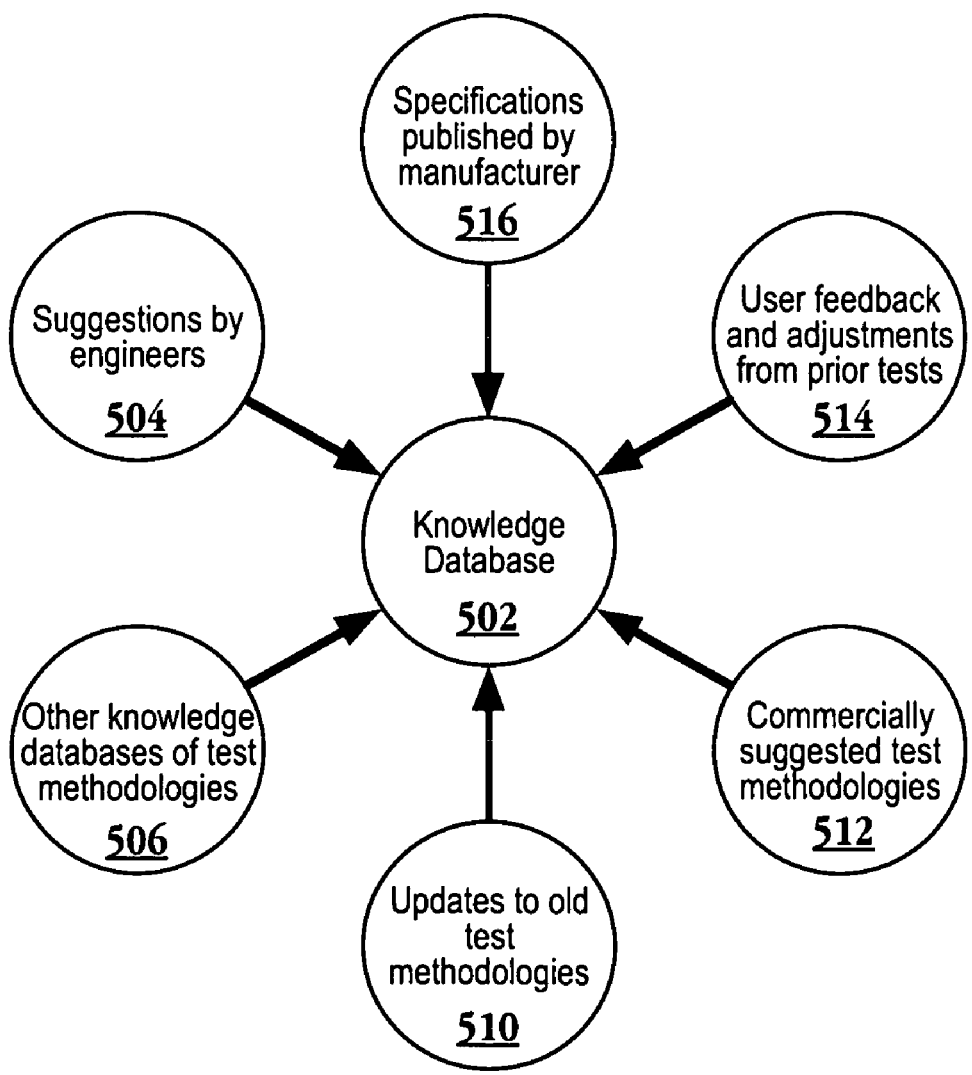
FIG. 5 is a simplified schematic diagram illustrating the source of data for a knowledge database, in accordance with one embodiment of the invention.

FIG. 5 is a simplified schematic diagram illustrating the source of data for knowledge database 502, in accordance with one embodiment of the invention. As discussed above in operation 212 of FIGS. 2 and 3, after the test system receives user inputs, the test system searches knowledge database 502 to identify test plan parameters. As discussed above, examples of test plan parameters include test methodologies, functional specifications, design specifications, components, etc. associated with the communication device. Knowledge database 502 contains a collection of test plan parameters from various sources. For instance, one source is from commercially suggested test methodologies 512 such as, for example, test methodologies from journal publications (e.g., The Journal of Test Methodology) and from test methodology publications by the manufacturer of the communication device. Another exemplary source is from user feedback and adjustments to test plans from prior tests 514. Specifications of the communication device published by the manufacturer 516 can also be another source. Other exemplary sources include suggestions by engineers 504, updates to old test methodologies 510, other knowledge databases of test methodologies 506, etc.

Figure 6:
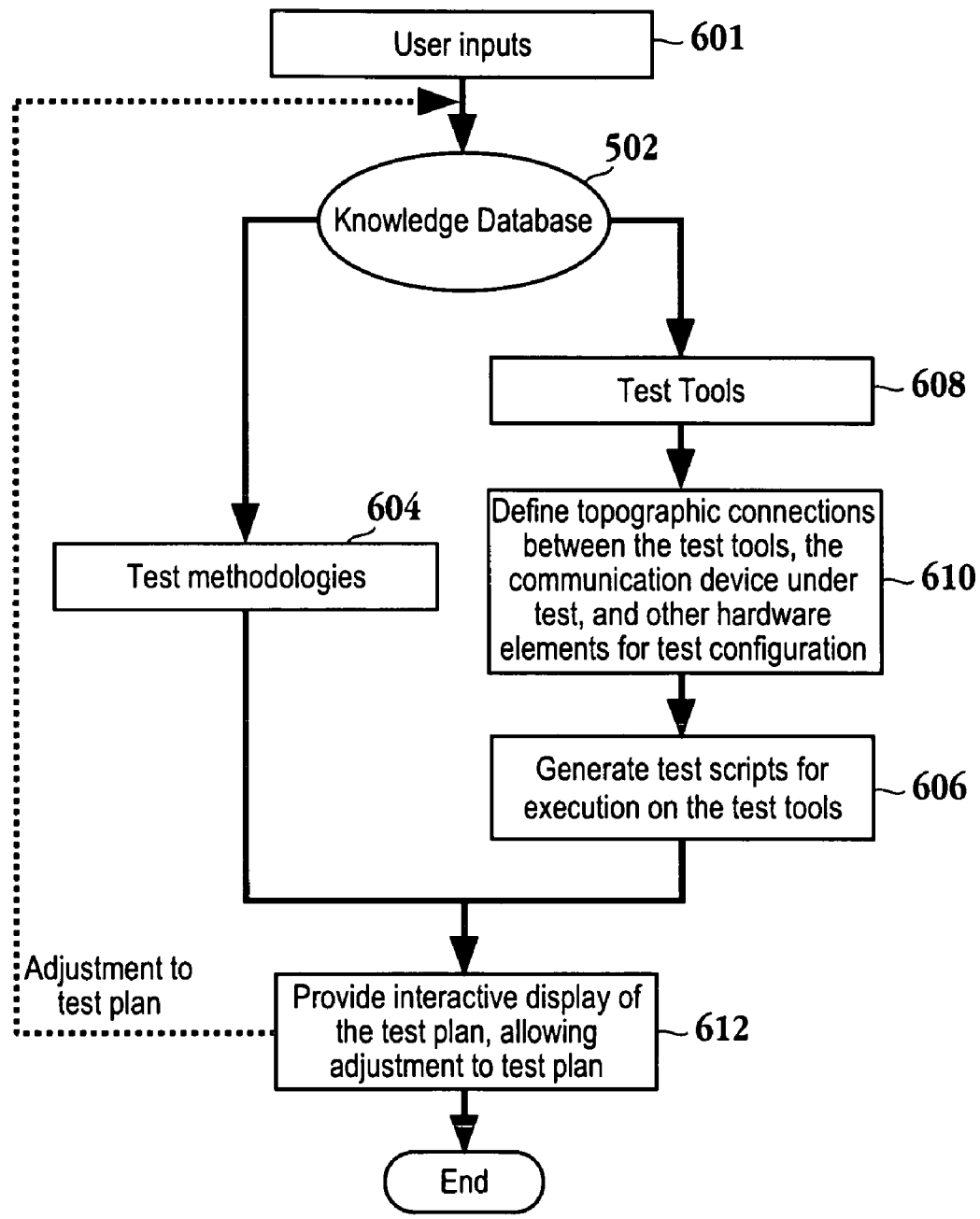
FIG. 6 is a state diagram illustrating the detailed method operations for generating a test plan for a communication device under test, in accordance with one embodiment of the invention.

FIG. 6 is a state diagram illustrating the detailed method operations for generating a test plan for a communication device under test, in accordance with one embodiment of the invention. Based on user inputs 601, knowledge database 502 identifies test plan parameters. The test system then analyzes the test plan parameters and user inputs 601 to identify the test plan for the communication device under test. The test plan includes test methodologies 604, test tools 608, test scripts 606, and topographic connections between the test tools, the communication device under test, and other hardware elements to define test configuration 610. Subsequently, in operation 612, the test system provides an interactive GUI display of the test plan, which allows adjustments to the test plan, in accordance with another embodiment of the invention. For example, a user may adjust the test plan by substituting test scripts 606 with other user-defined test scripts. If the user adjusts the test plan, the test plan may again be reanalyzed with new test plan parameters based on the adjustment.

Figure 7:
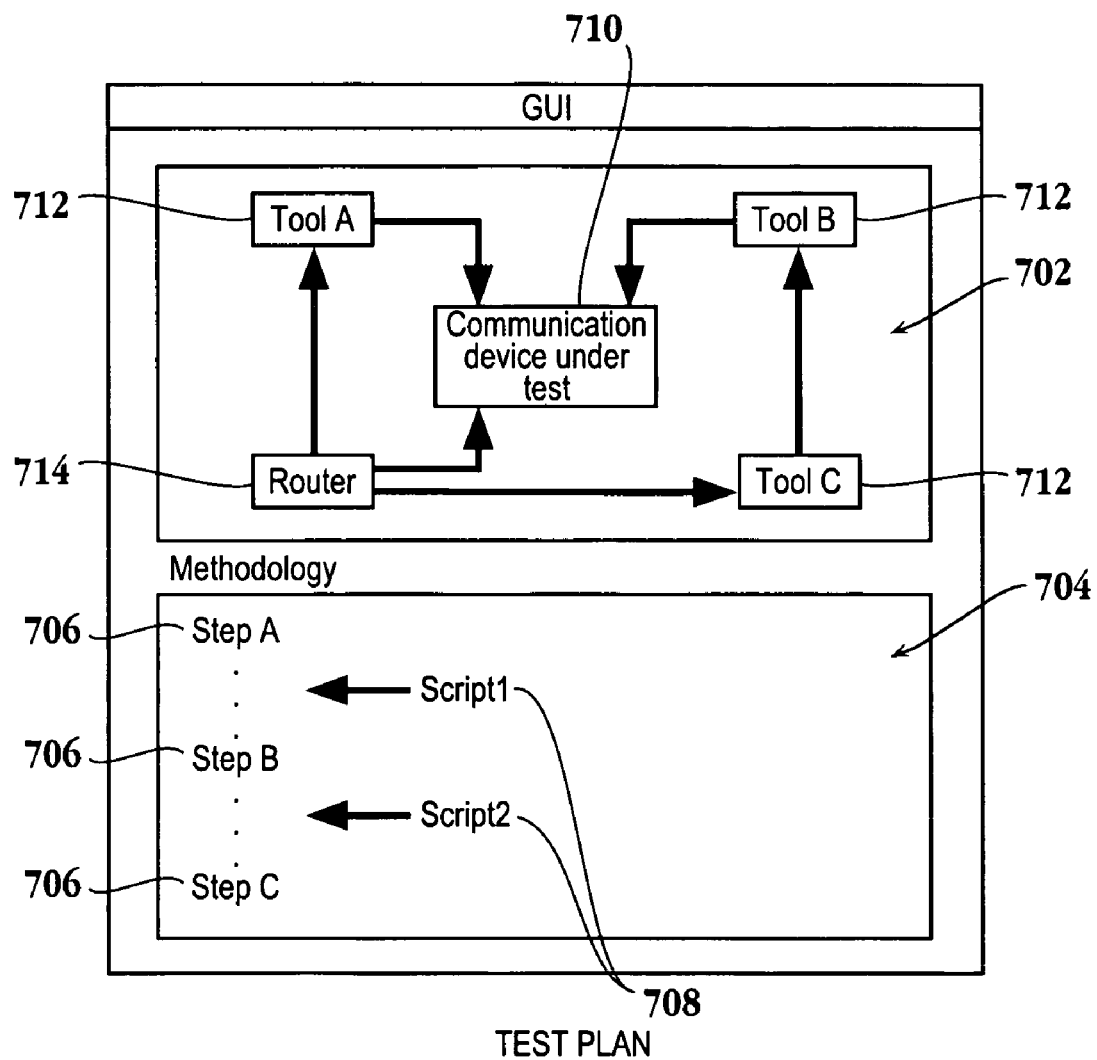
FIG. 7 is a schematic diagram of a GUI showing a test plan, in accordance with one embodiment of the invention.

FIG. 7 is a schematic diagram of a GUI showing a test plan, in accordance with one embodiment of the invention. As discussed above in operation 216 of FIGS. 2 and 3, the test system outputs the test plan after the test plan is identified. In one embodiment, region 702 displays a test configuration. Test configuration includes a layout of a communication device under test 710, test tools 712, and other hardware elements, such as router 714, not under test. In another embodiment, region 704 displays the test methodologies and algorithms for executing the test. As illustrated, region 704 includes a series of working procedures 706 and algorithms, such as test scripts 708 executed on test tools 712.

Any number of suitable layouts can be designed for region layouts illustrated above as FIGS. 4A, 4B, and 7 do not represent all possible layout options available. The displayable appearance of the regions can be defined by any suitable geometric shape (e.g., rectangle, square, circle, triangle, etc.), alphanumeric character (e.g., A, v, t, Q, 1, 9, 10, etc.), symbol (e.g., $, *, @, α, ﬀ, ¤, ♥, etc.), shading, pattern (e.g., solid, hatch, stripes, dots, etc.), and color. Furthermore, for example, menu regions 406 and 410 in FIG. 4, or any other region, may be omitted or dynamically assigned. It should also be appreciated that the regions can be fixed or customizable. In addition, the test system may have a fixed set of layouts, utilize a defined protocol or language to define a layout, or an external structure can be reported to the test system that defines a layout. Finally, selecting on a region of GUI as discussed above triggers code to cause the functionality described herein.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer implemented method for generating a test plan for a communication device under test, comprising:

receiving a user input being selected from a graphical user interface menu, the user input defining the communication device under test, a test topology defined in a graphical arrangement of the communication device under test with respect to other hardware elements, and a feature to test, the feature is selected from the group consisting of a reliability, a stability, a recoverability, a scalability, and a manageability;

searching a knowledge database to identify test plan parameters for the communication device under test based on the feature;

analyzing the test plan parameters and the user input to identify the test plan, the test plan defining test tools, test methodologies, test configurations, and algorithms for executing a test using the test plan; and displaying the test plan.

2. The method of claim 1, wherein the method operation of searching a knowledge database further includes, associating the test parameters with the feature.

3. The method of claim 2, wherein the feature includes a performance and a compatibility.

4. The method of claim 1, further comprising:

outputting the test plan enabling the test plan to be graphically displayed on a display screen.

5. The method of claim 1, wherein the communication device under test is selected from the group consisting of a router, a server, a switch, a load balancer, a cache, a firewall, an accelerator, a voice processing system, a storage network, and a gateway.

6. The method of claim 1, wherein the algorithms are test scripts for executing at least portions of the test methodologies on a test tool.

7. The method of claim 1, wherein the test plan parameters are selected from the group consisting of a test methodology, a functional specification, a design specification, a duration, a test goal, a number of interfaces, and a component associated with the communication device under test.

8. The method of claim 1, wherein the test methodologies are a series of working procedures enabling execution of the test under the test plan.

9. A computer readable medium having program instructions for generating a test plan for a communication device under test, comprising:

program instructions for receiving a user input being selected from a graphical user interface menu, the user input defining the communication device under test, a test topology defined in a graphical arrangement of the communication device under test with respect to other hardware elements, and a feature to test, the feature is selected from the group consisting of a reliability, a stability, a recoverability, a scalability, and a manageability;

program instructions for searching a knowledge database to identify test plan parameters for the communication device under test based on the feature;

program instructions for analyzing the test plan parameters and the user input to identify the test plan and program instructions for displaying the test plan.

10. The computer readable medium of claim 9, wherein the test plan is defined by test tools, test methodologies, test configurations, and algorithms for executing a test using the test plan.

11. The computer readable medium of claim 9, wherein the program instructions for receiving the user input further includes, program instructions for defining a test topology.

12. The computer readable medium of claim 9, wherein the program instructions for searching a knowledge database further includes, program instructions for associating the test parameters with the feature.

13. The computer readable medium of claim 12, wherein the feature to test includes a performance and a compatibility.

14. The computer readable medium of claim 9, further comprising:

program instructions for outputting the test plan enabling the test plan to be graphically displayed on a display screen.

15. The computer readable medium of claim 9, wherein the algorithms are test scripts for executing at least portions of the test methodologies on a test tool.

16. The computer readable medium of claim 9, further comprising:

program instructions for outputting the test plan enabling the test plan to be printed.

17. The computer readable medium of claim 9, wherein the test methodologies are a series of working procedures enabling execution of the test under the test plan.

18. A system for generating a test plan for a communication device under test, comprising:

a display screen;

a processor for enabling a user input being selected from a graphical user interface menu displayed on the display screen, the user input defining the communication device under test, a test topology defined in a graphical arrangement of the communication device under test with respect to other hardware elements, and a feature to test, the feature is selected from the group consisting of a reliability, a stability, a recoverability, a scalability, and a manageability; and a knowledge database stored in a memory enabling a search of the knowledge database to identify test plan parameters associated with the communication device under test based on the feature, wherein the processor analyzes the test plan parameters and the user input to identify the test plan, the test plan defining test tools, test methodologies, test configurations, and algorithms for executing a test using the test plan to display the test plan on the display screen.

19. The method of claim 18, wherein the feature to test includes a performance and a compatibility.

20. The method of claim 18, wherein the knowledge database is remotely located from the communication device under test.

21. The system of claim 18, wherein the communication device under test is selected from the group consisting of a router, a server, a switch, a load balancer, a cache, a firewall, an accelerator, a voice processing system, a storage network, and a gateway.

* * * * *